Aug. 2, 1927.    F. M. A'HEARN ET AL    1,637,330
WHEEL MACHINING APPARATUS
Filed Sept. 22, 1926    4 Sheets-Sheet 1
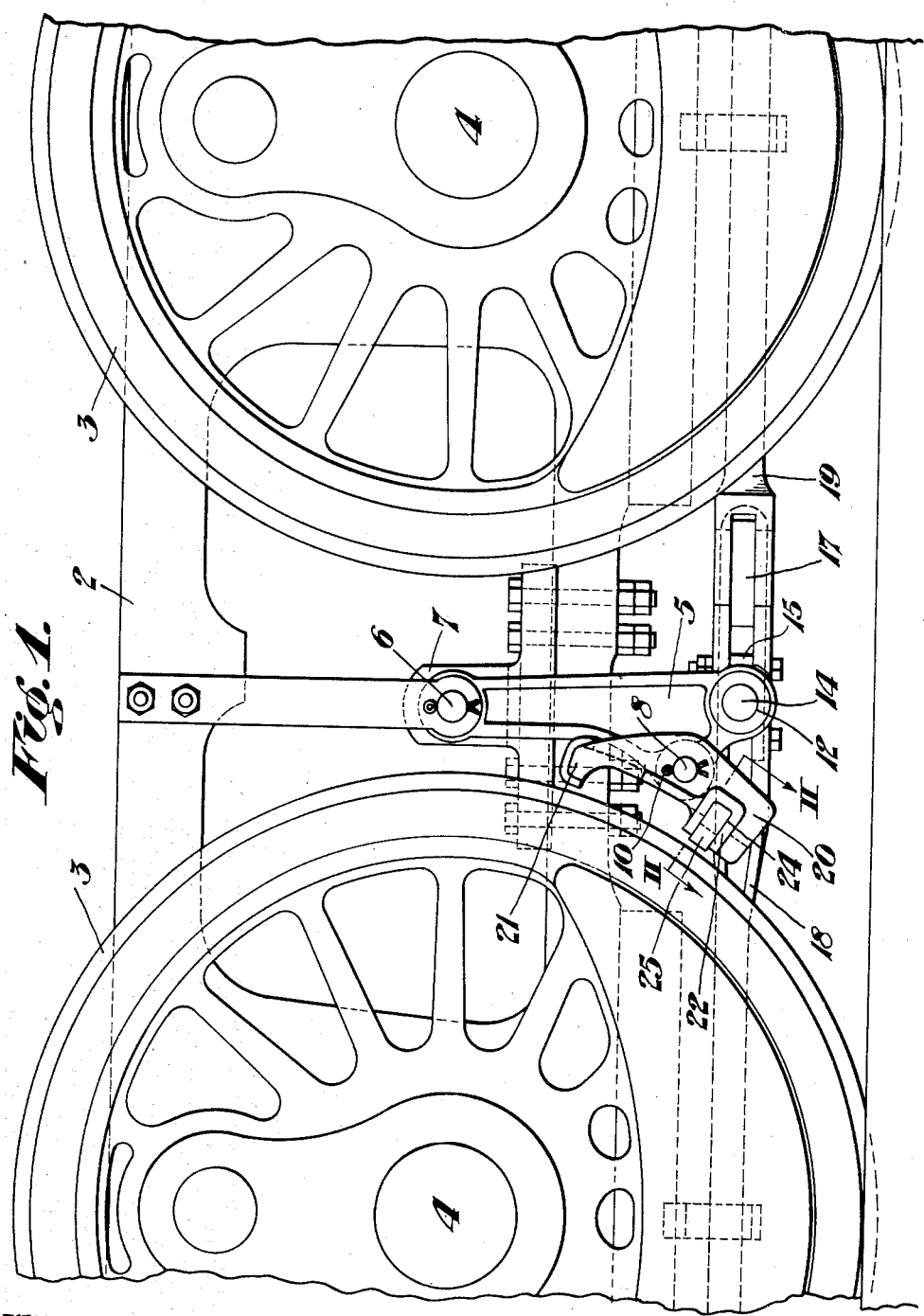
Witnesses:
Edwin Trueb
Inventors:
FRANK M. A'HEARN and
EDWIN FOSTER RICHARDSON.
by: D Anthony Usina
their Attorney.

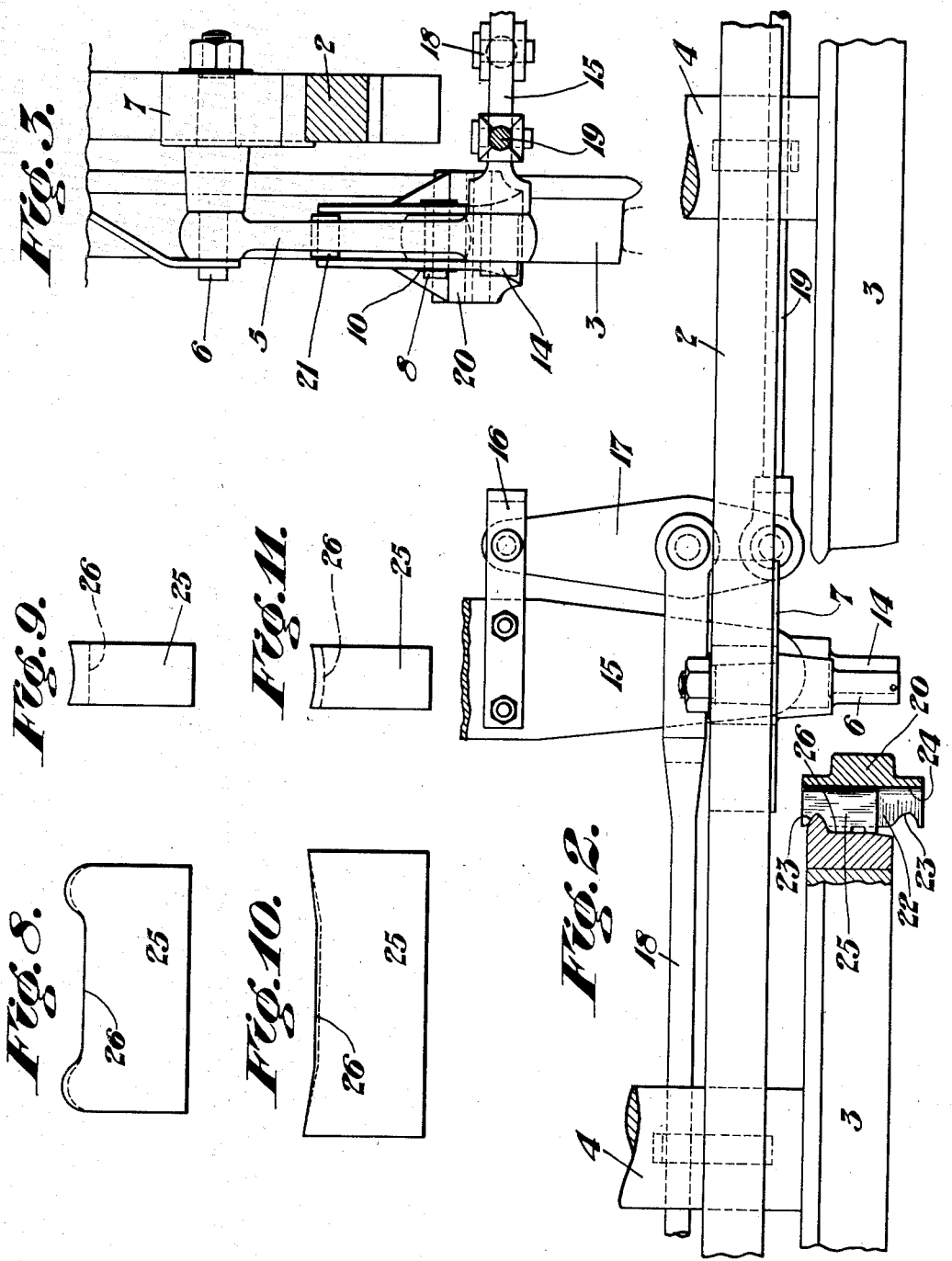

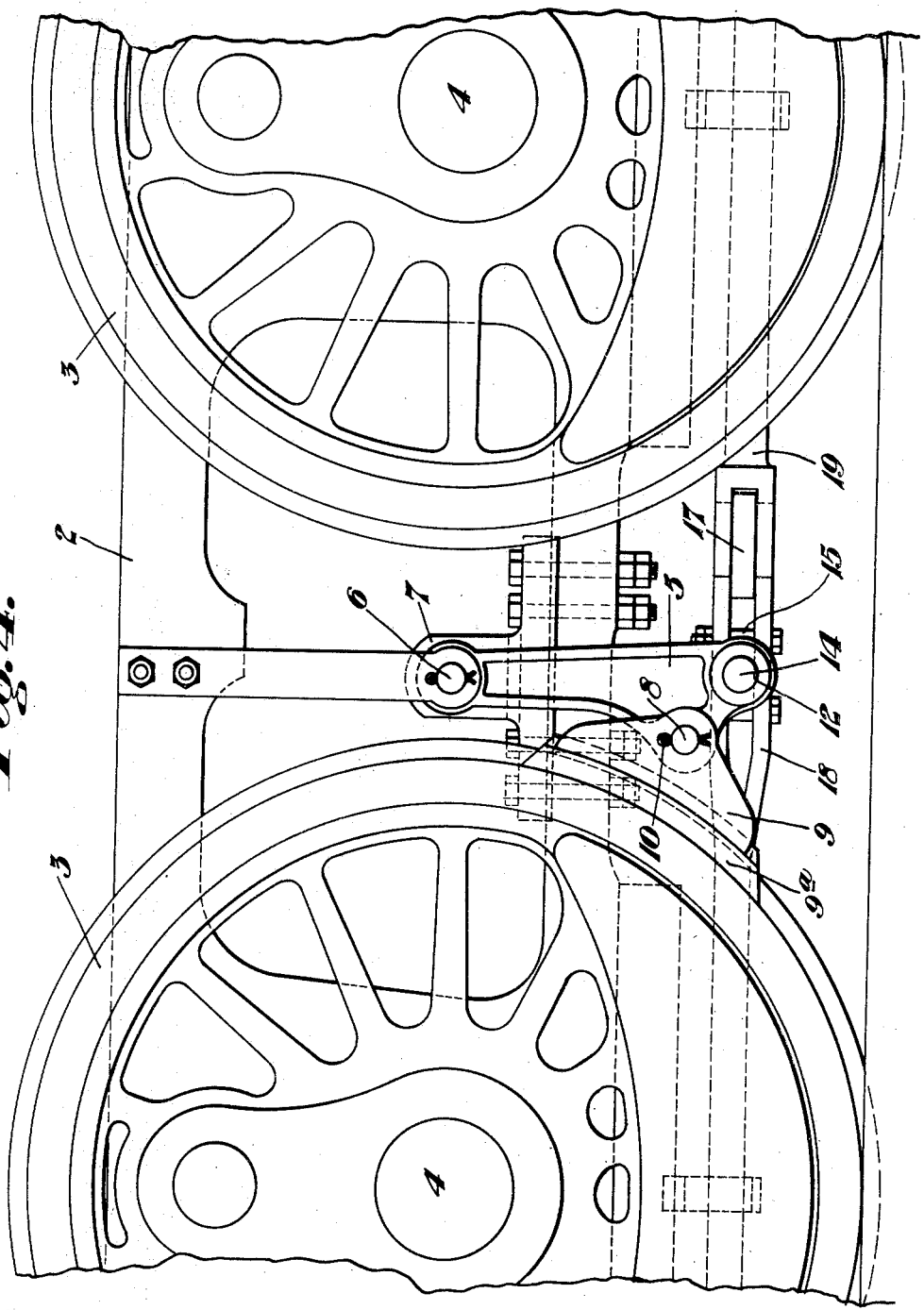

Aug. 2, 1927. 1,637,330
F. M. A'HEARN ET AL
WHEEL MACHINING APPARATUS
Filed Sept. 22, 1926   4 Sheets-Sheet 4
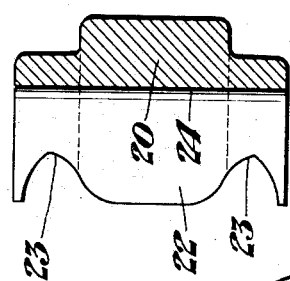
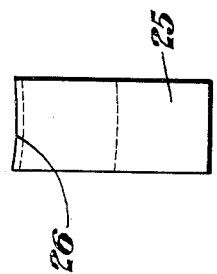
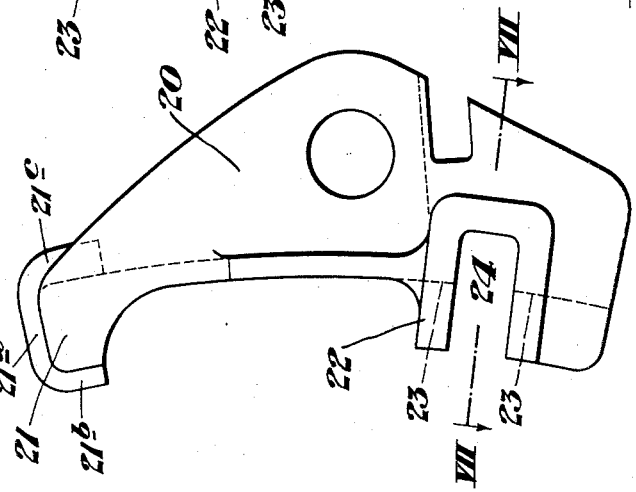
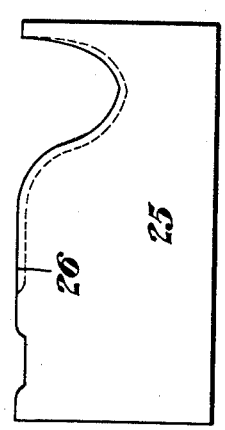
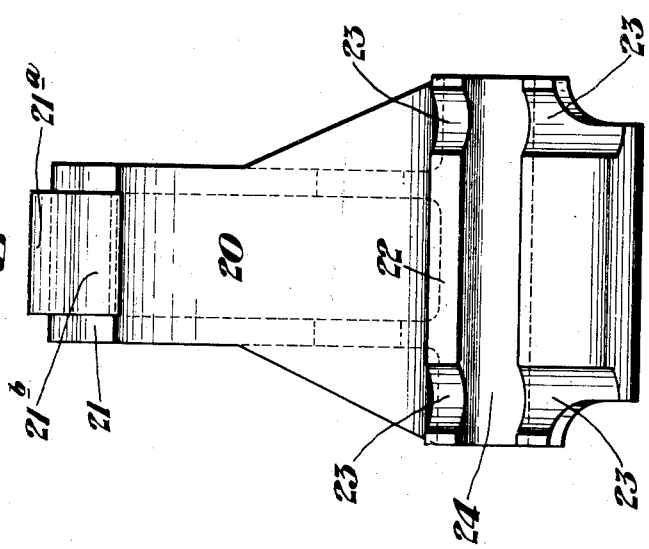
Witnesses:
Edwin Trueb
Inventors:
FRANK M. A'HEARN and
EDWIN FOSTER RICHARDSON.
by D Anthony Usina
their Attorney.

Patented Aug. 2, 1927.

1,637,330

UNITED STATES PATENT OFFICE.

FRANK M. A'HEARN AND EDWIN FOSTER RICHARDSON, OF GREENVILLE, PENNSYLVANIA.

WHEEL-MACHINING APPARATUS.

Application filed September 22, 1926. Serial No. 137,003.

This invention relates to apparatus or tools for machining the treads of wheels or wheel tires of railway rolling stock, and while not limited thereto, relates to an apparatus or tool for attachment to the brake mechanism of a piece of railway rolling stock and adapted to machine the tread of a tire or wheel while said wheel is mounted in its normal operative position and is moving on the rails of a railway track.

As is well known in the art the treads of the driving wheels of a locomotive become worn due to use, which results in high and thick flanges, untrue vertical flanges, an accumulation of rolled out metal on the tread of blind tires etc., all of which are objectionable. Heretofore, in order to correct any of the above faults it was necessary to remove the wheels from the locomotive and turn down the wheel treads and flanges in a wheel lathe. This operation required considerable labor and time and resulted in the necessary retirement of the locomotive from use for a period of from twenty to thirty days.

The present invention provides a tool which is substituted for the brake heads of a locomotive and will machine the wheel treads as the locomotive is moved slowly under its own power, and the entire operation of applying the tool, machining the wheel treads, and remounting the brake heads may be accomplished in from 30 to 45 minutes, thereby reducing the time, labor and expense of reconditioning or machining worn treads to a minimum.

In the drawings—

Figure 1 is a partial side elevation showing a pair of drive wheels and a part of the underframe of a locomotive having our invention applied thereto.

Figure 2 is a plan view of a similar part of a locomotive with the tool of this invention sectioned on the line II—II of Figure 1.

Figure 3 is an end elevation showing the invention.

Figure 4 is a view similar to Figure 1, showing the standard brake head in position as it is prior to mounting of the tool of this invention and after the tool is removed.

Figure 5 is an enlarged front elevation of the tool holder of this invention.

Figure 6 is a side elevation thereof.

Figure 7 is a sectional plan on the line VII—VII of Figure 6.

Figures 8 and 9 are side and end elevations, respectively, of a rough turning tool for blind or non-flanged wheels.

Figures 10 and 11 are side and end elevations, respectively, of a finish turning tool for blind or non-flanged wheels.

Figures 12 and 13 are side and end elevations, respectively, of a tool for turning flanged wheels.

Referring more particularly to the drawings, the numeral 2 designates the underframe of a locomotive, and the numeral 3 designates the driving wheels which are journaled on axles 4.

The usual brake mechanism on locomotives is shown, which comprises a brake shoe hanger or support 5 pivotally suspended from a trunnion 6 mounted in a bracket 7 secured to the underframe 2.

The hanger 5 is provided with a trunnion 8 on which a brake head 9 carrying brake shoe 9ª is pivotally mounted. The brake head is held in place on the trunnion 8 by a cotter pin 10 which passes through a suitable aperture in the trunnion.

The hanger 5 is provided at its lower end with a bearing 12 to receive the trunnioned end 14 of a floating brake beam 15, so that when the brake beam is reciprocated the hanger 5 will be swung to apply or release the brake shoe.

A bracket 16 is secured to and projects from the floating brake beam 15 and a floating lever 17 is pivotally secured thereto. The usual brake rods 18 and 19 are pivotally secured to the lever 17. The rod 18 is adapted to be operated by a fluid pressure cylinder (not shown,) to operate the lever 17 and brake beam 15, while the rod 19 is adapted to operate the brake beam of a second brake mechanism (not shown).

The reconditioning or turning tool of this invention comprises a body portion or tool holder 20 having the general contour of a brake head and shoe, and provided with an aperture or opening to receive the trunnion 8 when the tool holder 20 is substituted for the brake head.

The tool holder 20 has its wheel engaging face provided with a heel 21 and a projecting tool holding portion 22. The portion 22 is provided with clearance grooves 23 to clear the wheel flanges. The grooves 23 are provided adjacent each side of the holder so as to permit the holder to be used on either side of a locomotive. The grooves 23 also serve to guide the tool holder while in use and cause it to follow the contour of the wheel.

The portion 22 of the tool holder 20 is also provided with a transverse tool receiving slot 24 in which cutting tools or bits 25 are removably mounted.

A removable U-shaped heel piece 21ª is adapted to be mounted over the heel end of the holder 20. The heel piece 21ª has leg portions 21ᵇ and 21ᶜ of unequal thickness, so that by reversing its position on the heel 21 the distance of the heel 21 from the periphery of the wheel may be varied and consequently the position of the cutting tool or bit 25 varied relative to the tire, since the changing of the position of the heel 21 will cause the tool holder 20 to rock or rotate about the trunnion 8.

The tools 25 are shown in Figures 8 to 13, inclusive, and working faces 26 shaped to fit the face of the wheel being turned or reconditioned.

The tool shown in Figures 8 and 9 is for use in rough turning or reconditioning blind or non-flanged wheels or tires, while the tool shown in Figures 10 and 11 is for finish turning or reconditioning the blind wheels or tires.

The tool shown in Figures 12 and 13 is for turning or reconditioning flanged wheels or tires.

In operation, when it is desired to recondition or turn the tread of the driving wheels or tires of a locomotive, it is only necessary to remove the brake heads from the trunnions 8 and to then mount the tool holders 20 on the trunnions with the correct tools or bits for turning the wheels or tires mounted in slots 24 of the tool holders. After the tool holders 20 are mounted in position, the locomotive is moved slowly under its own power along the track, or the wheels are rotated slowly while the locomotive is supported clear of the tracks by jacks or other mechanism. After the wheels are rotating the brake mechanism will be operated in the same manner as when applying or forcing the brake shoes against the wheels. However, since the tool holders 20 are substituted for the brake heads the tool holders will be moved toward the wheel treads and the tools or bits 25 will engage the rotating wheels and cut or turn down the treads and flanges to the correct contour. After the treads and flanges of the wheels are reconditioned, the tool holders 20 are removed and the brake heads 9 carrying shoes 9ª are remounted, thus completing the operation so that the locomotive is again ready for service in from thirty to forty-five minutes.

While we have shown and described one specific embodiment of our invention, it will be understood that we do not wish to be limited thereto since various modifications may be made without departing from the scope of our invention as defined in the appended claims.

We claim—

1. A cutting tool for re-turning the treads of wheels and tires on railway rolling stock having brake mechanism including brake heads having brake shoes mounted thereon, said tool comprising a body portion adapted to be substituted for said brake heads, said body portion having a projecting transversely slotted tool holding portion adjacent one end of its wheel engaging face, a cutter bit in the slot in said tool holding portion, and a heel portion adjacent the other end of said wheel engaging face of said body portion adapted to engage the wheel tread being turned to determine the position of the cutter bit relative to the wheel tread.

2. A cutting tool for re-turning the treads of wheels and tires on railway rolling stock having brake mechanism including brake heads having brake shoes mounted thereon, said tool comprising a body portion adapted to be substituted for said brake heads, said body portion having a projecting transversely slotted tool holding portion adjacent one end of its wheel engaging face, a cutter bit in the slot in said tool holding portion, a heel portion adjacent the other end of said wheel engaging face of said body portion, and a removable heel piece mounted on said heel for varying the distance of said tool from the wheel tread.

3. A cutting tool for re-turning the treads of wheels and tires on railway rolling stock having brake mechanism including brake heads having brake shoes mounted thereon, said tool comprising a body portion adapted to be substituted for said brake heads, said body portion having a projecting transversely slotted tool holding portion adjacent one end of its wheel engaging face, a cutter bit in the slot in said tool holding portion, said tool holding portion being shaped to fit the contour of said wheel tread and thus serve to prevent side motion of said tool relative to the wheel tread, and a heel portion adjacent the other end of said wheel engaging face of said body portion adapted to determine the position of the cutter bit relative to the wheel tread.

In testimony whereof, we have hereunto set our hands.

FRANK M. A'HEARN.
EDWIN FOSTER RICHARDSON.